United States Patent
Watanabe

(10) Patent No.: US 7,330,589 B2
(45) Date of Patent: Feb. 12, 2008

(54) IMAGE PARTITIONING APPARATUS AND METHOD

(75) Inventor: Kazuyo Watanabe, Tokyo (JP)

(73) Assignee: Oki Data Corpoartion, Tokyo (JP)

( * ) Notice: Subject to any disclaimer, the term of this patent is extended or adjusted under 35 U.S.C. 154(b) by 629 days.

(21) Appl. No.: 10/975,532

(22) Filed: Oct. 29, 2004

(65) Prior Publication Data

US 2005/0111734 A1 May 26, 2005

(30) Foreign Application Priority Data

Nov. 20, 2003 (JP) ............................. 2003-390258

(51) Int. Cl.
G06K 9/34 (2006.01)
(52) U.S. Cl. ...................................... 382/173; 382/171
(58) Field of Classification Search ................ 382/164, 382/168, 171, 173, 176, 199; 348/135, 586, 348/596
See application file for complete search history.

(56) References Cited

U.S. PATENT DOCUMENTS 6,078,688 A * 6/2000 Cox et al. ................... 382/173

2002/0181771 A1* 12/2002 Li et al. ...................... 382/173

FOREIGN PATENT DOCUMENTS

JP 10-187936 7/1998

* cited by examiner

Primary Examiner—Duy M. Dang
(74) Attorney, Agent, or Firm—Rabin & Berdo, P.C.

(57) ABSTRACT

An image processing apparatus sets an image reference position in an input image, calculates a distribution of weights from the image reference position, sets a starting position in the input image, and partitions the input image into areas by working outward from the starting position, using the distribution of weights to calculate thresholds for adding picture elements to existing areas. The distribution of weights may, for example, allow picture elements distant from the image reference position to be added to a background area more easily than picture elements closer to the image reference position. In addition, multiple starting positions may be set. These provisions enable the background to be identified as a single area without requiring user input of an outline around each non-background area.

20 Claims, 11 Drawing Sheets

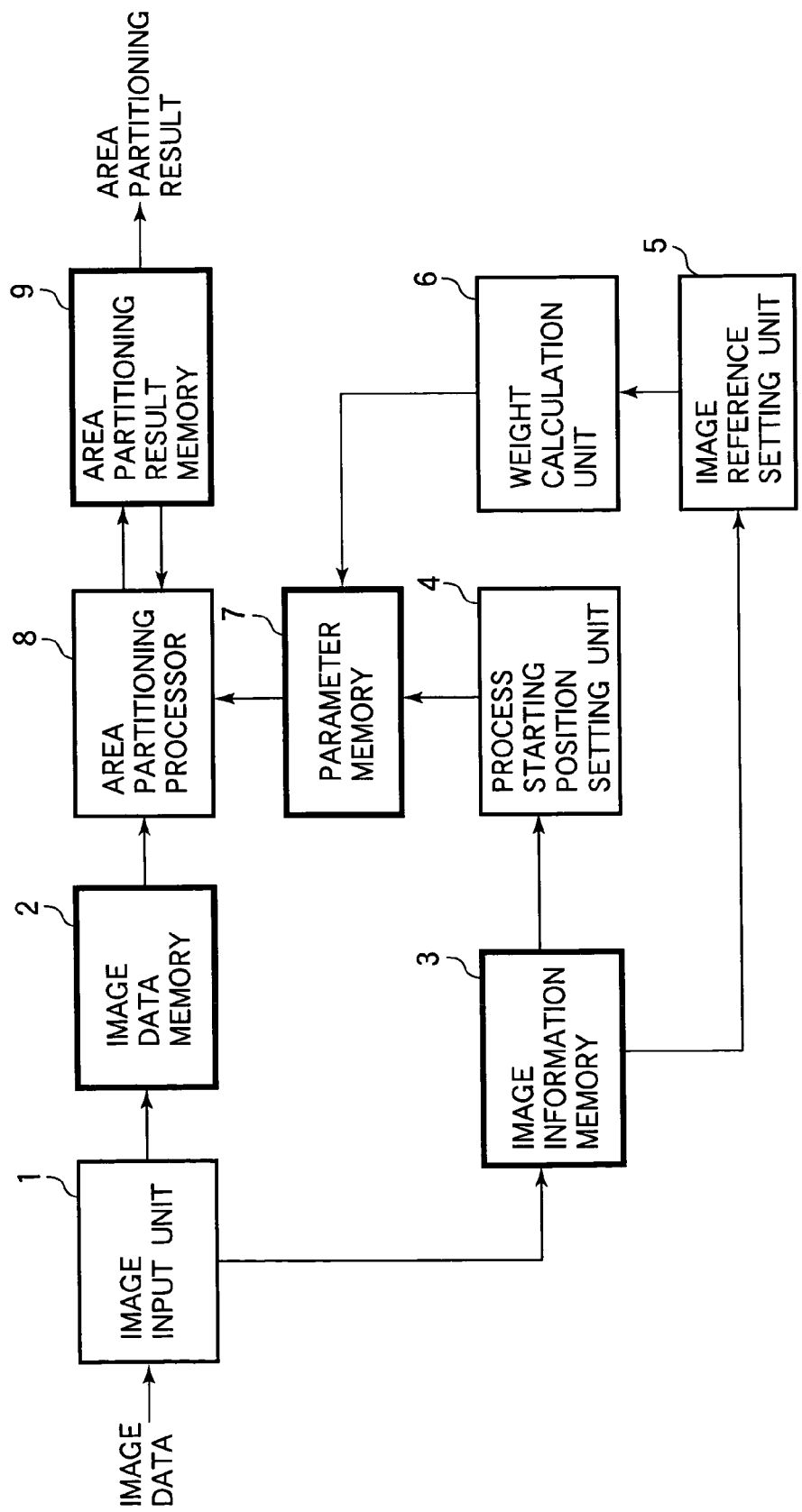

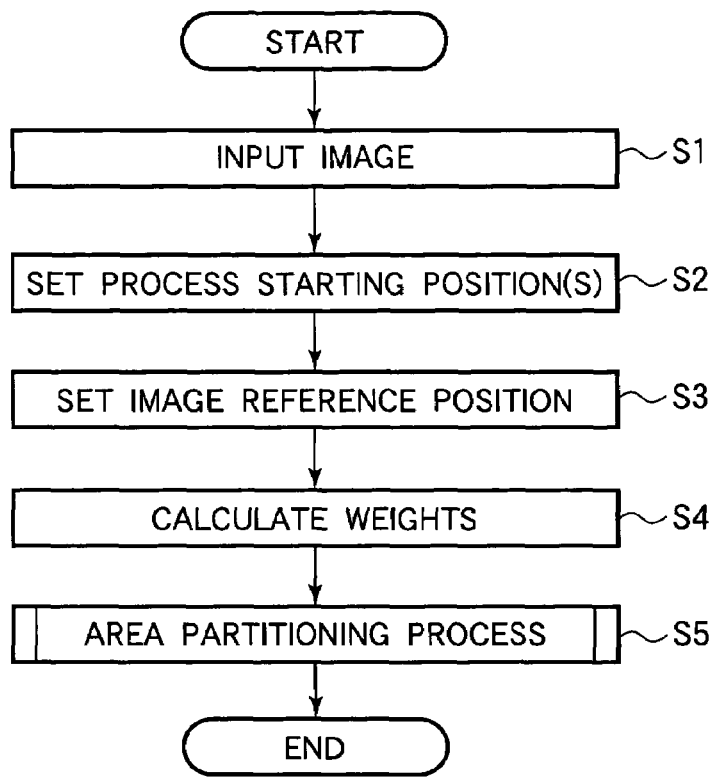
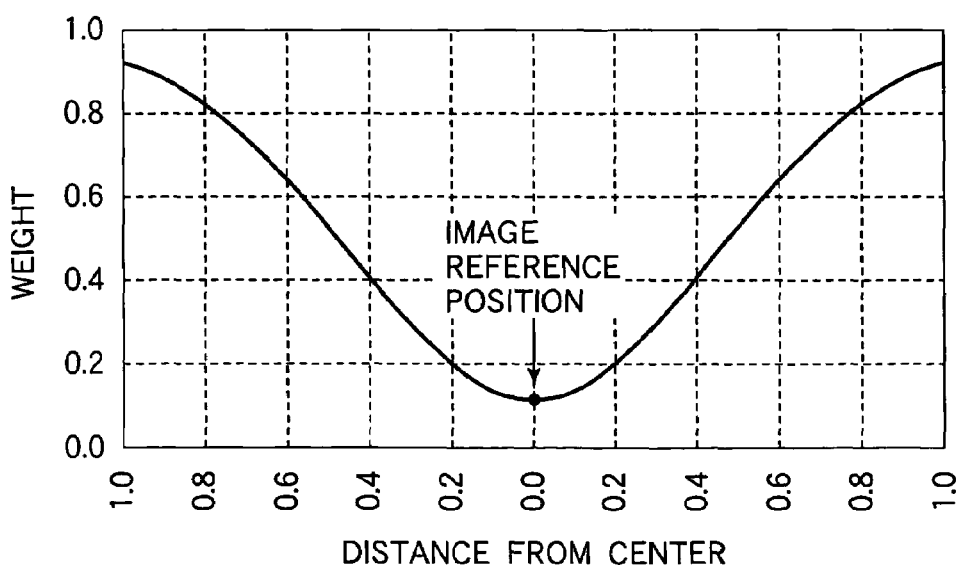

BACKGROUND  SUBJECT

SUBJECT

BACKGROUND  SUBJECT

BACKGROUND

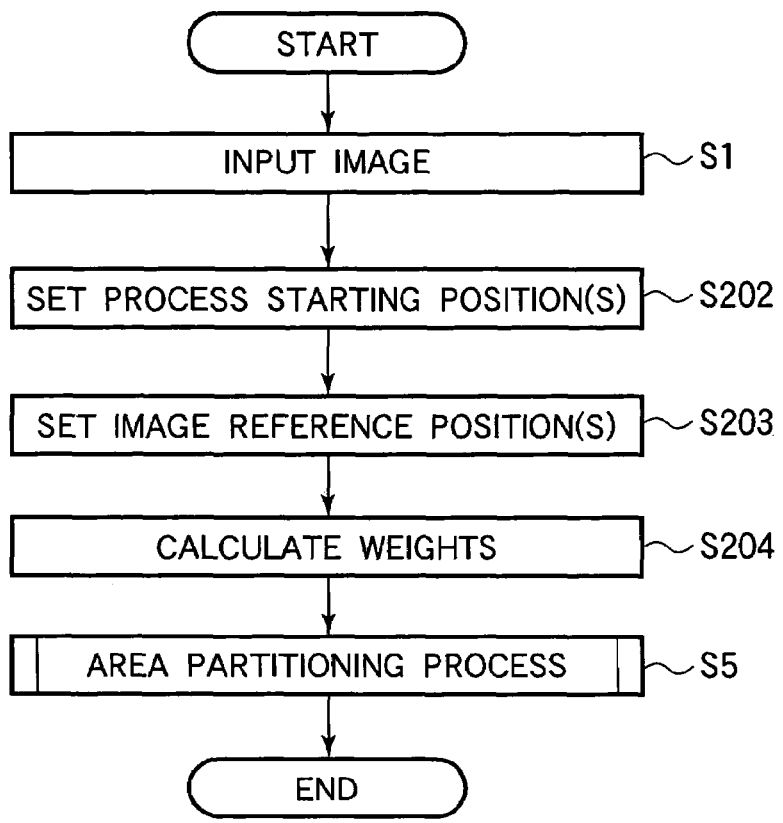
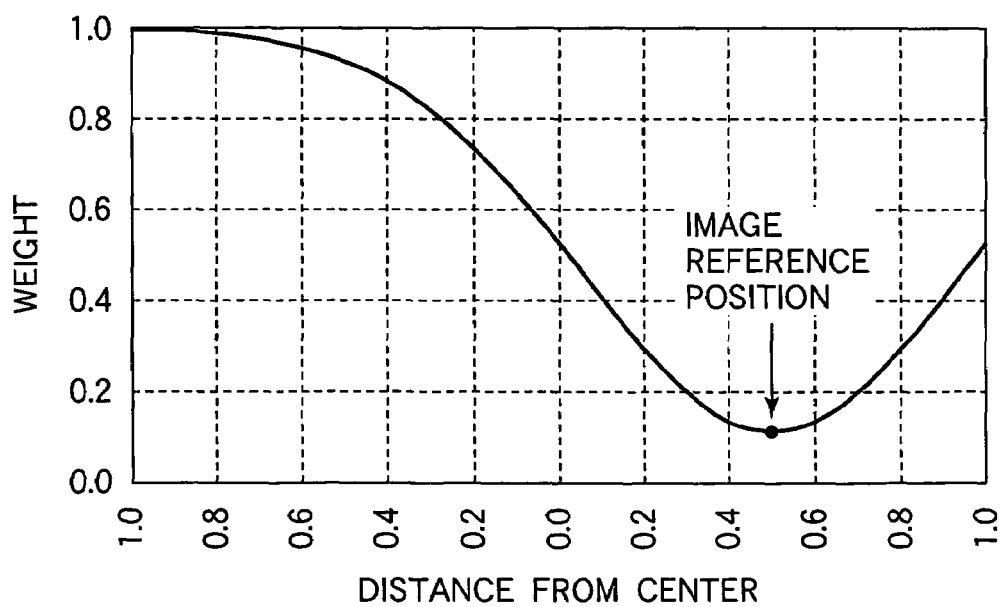

IMAGE PARTITIONING APPARATUS AND METHOD

BACKGROUND OF THE INVENTION

1. Field of the Invention

The present invention relates to an image processing apparatus and method in which a digitized image is partitioned into areas.

2. Description of the Related Art

A digitized image comprises a plurality of picture elements (pixels) having digital pixel values. Digitized images can be processed in many useful ways. For example, an image captured by a digital camera can be processed to make subject areas stand out from the background. For this and many other purposes, it is necessary to identify the subject and background areas. The simplest method is to display the image on a computer screen and have the computer user trace the precise outline of each subject area with a pointing device such as a mouse, but this is an exacting and difficult task, especially when the outline has a complex shape.

Alternative methods described in Japanese Unexamined Patent Application Publication No. H10-187936, for example, allow the user to designate a rough outline around each subject area, and have the computer itself remove background areas from inside the outline, leaving only the desired subject area. As a first step, the computer partitions the image, or the part of the image inside the outline, into areas in which mutually adjacent pixels have similar pixel values. In one method, the computer then removes relatively large areas from within the outline. In another method, the computer weights each pixel in the image according to its distance from the user-designated outline, totals the weights in each area to obtain an area weight, classifies the areas as subject or background according to their weights, and repeats this process with different user-designated outlines until the user is satisfied with the result.

A problem with these rough-outline methods is that even drawing a rough outline with a pointing device such as a mouse is a troublesome procedure, especially if the procedure has to be repeated.

A further problem is that in dividing the image into areas, these methods compare the difference between adjacent pixel values with a fixed threshold. When the background area has a gradation of pixel values, for example, it therefore tends to become unnecessarily divided into a plurality of sub-areas, which makes it difficult to discriminate between background and subject areas, and complicates further processing of the background area itself.

SUMMARY OF THE INVENTION

An object of the present invention is therefore to partition in image into subject and background areas without needing to have the subject areas outlined, even roughly.

Another object of the invention is to identify background in an image without dividing the background into a plurality of areas.

The invented image processing apparatus has a reference position setting unit that sets an image reference position in an input image. A weight calculation unit calculates a distribution of weights around the image reference position, providing an individual weight for each pixel in the input image. A starting position setting unit sets a starting position in the image. The starting position is typically located in a background area, and the image reference position in a subject area.

A partitioning processor partitions the input image into areas according to the distribution of weights calculated by the weight calculation unit and the starting position set by the starting position setting unit. For example, the partitioning processor may work outward from the starting position, adding each newly encountered pixel to an adjacent existing area if the difference between the pixel value of the newly encountered pixel and the average pixel value in the existing adjacent area is less than a threshold determined according to the weight of the newly encountered pixel.

A plurality of image reference positions and starting positions may be set, and these positions may be designated by a user of the apparatus. When there are a plurality of starting positions, the partitioning processor may identify a separate background area for each starting position, then combine the separate background areas into a single background area.

The weighting scheme described above enables even a background with a gradation of pixel values to be identified as a single area instead of a plurality of areas, and does not require the user to outline the subject areas. Speed and efficiency of image processing are improved accordingly.

BRIEF DESCRIPTION OF THE DRAWINGS

In the attached drawings:

FIG. 1 is a block diagram illustrating the structure of the image processing apparatus in a first embodiment of the invention;

FIG. 2 is a flowchart illustrating the operation of the image processing apparatus in the first embodiment;

FIG. 3 shows the distribution of weights when an image reference position is set at the center of the image;

FIG. 9 is a flowchart illustrating the operation of the image processing apparatus in the second embodiment;

FIG. 10 shows a weight distribution when an arbitrary position is set as an image reference position;

DETAILED DESCRIPTION OF THE INVENTION

Figure 4:
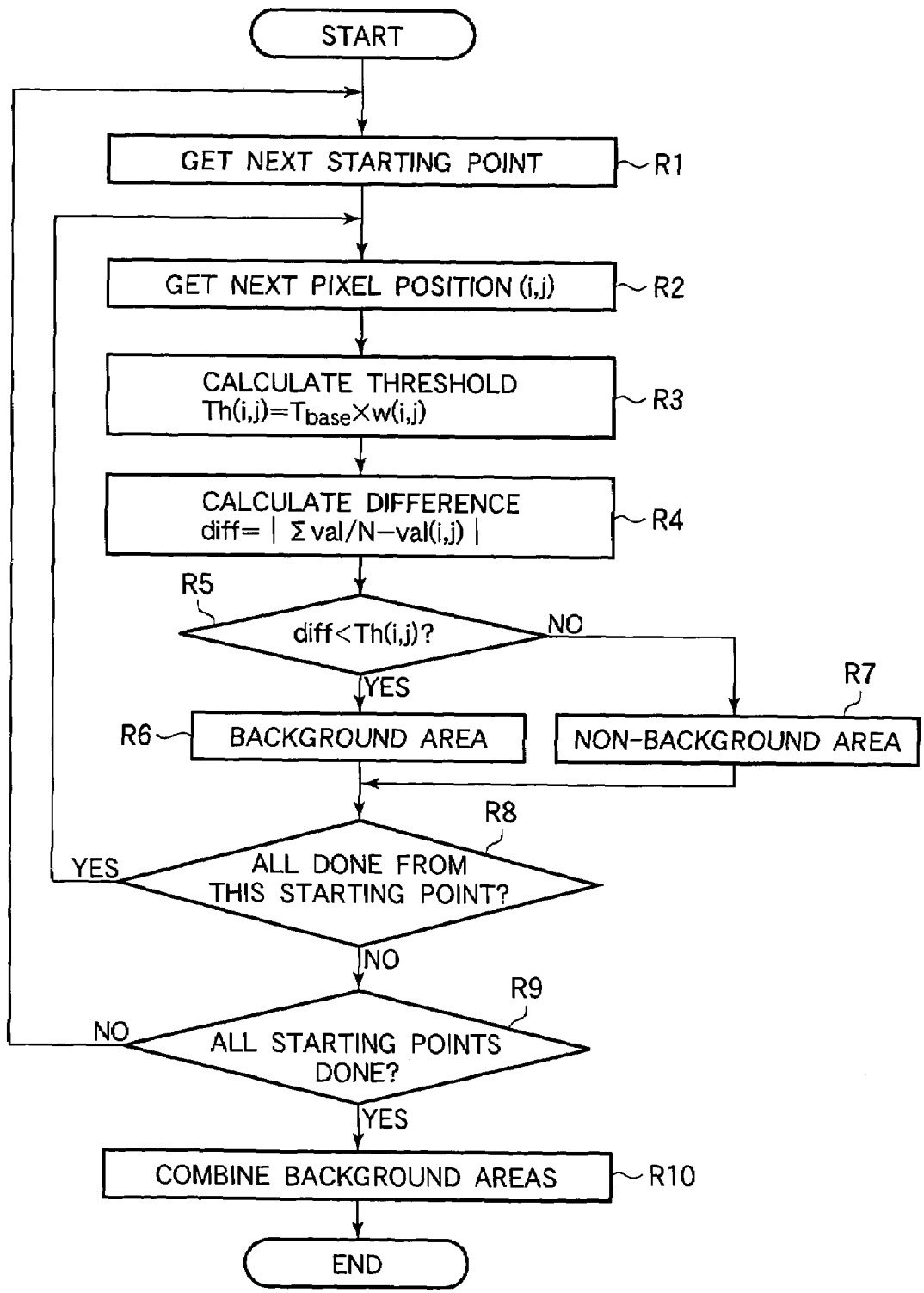
FIG. 4 is a flowchart illustrating details of the area partitioning process in the first embodiment and a second embodiment.
Figure 5:
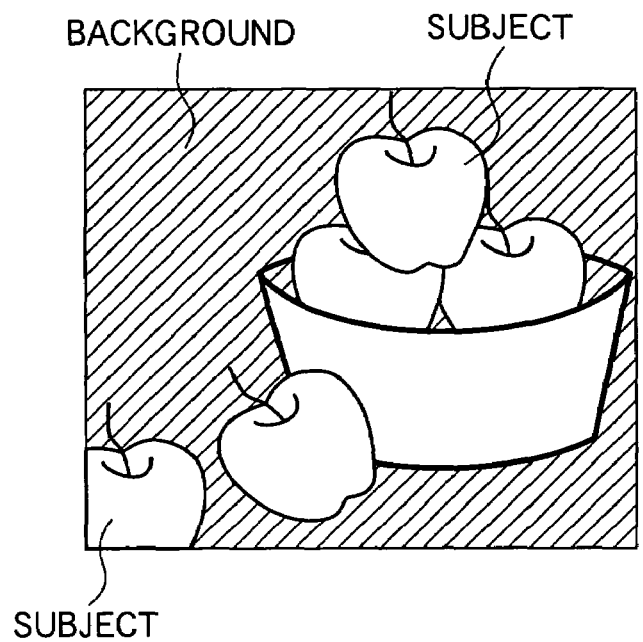
FIG. 5 shows an image in which the four corners cannot be set as process starting positions.

Embodiments of the invention will now be described with reference to the attached drawings, in which like elements are indicated by like reference characters.

First Embodiment

Referring to FIG. 1, the image processing apparatus comprises an image input unit 1, an image data memory 2, an image information memory 3, a process starting position setting unit 4, an image reference setting unit 5, a weight calculation unit 6, a parameter memory 7, an area partitioning processor 8, and an area partitioning result memory 9. The image input unit 1 performs image input processing, such as image format conversion, on an input image; the image data memory 2 stores the image data resulting from the image input processing; the image information memory 3 stores image information, such as the number of pixels in the horizontal and vertical directions of the image, which is acquired from the header of the input image data; the process starting position setting unit 4 refers to the image information stored in the image information memory 3 and sets the pixel positions in the four corners of the image as process starting positions of the area partitioning process; the image reference setting unit 5 refers to the image information stored in the image information memory 3 and sets a pixel position at the center of the image, which is least likely to belong to the background, as an image reference position; the weight calculation unit 6 calculates a weight for each pixel according to its positional relation with the set image reference position; the parameter memory 7 stores the process starting positions set by the process starting position setting unit 4, weights calculated by the weight calculation unit 6, and other parameters necessary for the area partitioning process; the area partitioning processor 8 performs the area partitioning process by using the image data stored in the image data memory 2, the parameters held in the parameter memory 7, and information about pixels that have already undergone the area partitioning process; this information is held in the area partitioning result memory 9. The result of the partitioning process performed by the area partitioning processor 8 is stored in the area partitioning result memory 9, and output to undergo further image processing.

Referring to the flowchart in FIG. 2, after image input processing is performed in step S1, process starting positions are set in step S2. In this embodiment, the process starting positions are placed in the four corners of the image. If the width and height of the image are expressed in pixels, the x-y coordinates $(X_{start}[*], Y_{start}[*])$ of the starting positions are given by the following relationships:

$(X_{start}[0], Y_{start}[0])=(0,0)$ upper-left corner $(X_{start}[1], Y_{start}[1])=(0, height-1)$ lower-left corner $(X_{start}[2], Y_{start}[2])=(width-1, height-1)$ lower-right corner $(X_{start}[3], Y_{start}[3])=(width-1, 0)$ upper-right corner Next, an image reference position is set in step S3. In this embodiment, the image reference position is set at the center of the image, so its x-y coordinates can be obtained from the following expressions:

$X_{ref}=width/2$ $Y_{ref}=height/2$

The operation now proceeds to step S4, in which the weights of pixels are calculated. The weight of a pixel of interest is calculated according to a weight distribution in which the x-y coordinates of the image reference position set in step S3 have minimum weights (refer to FIG. 3). In this embodiment, a Gaussian distribution f(x) with a maximum value at the x-y coordinates of the image reference position is used to calculate the weight w(i, j) of the pixel at the x-y coordinates (i, j) from the following equation, in which x is the distance from coordinate position (i, j) to the image reference position.

$w(i,j)=1.0-f(x)$  (1)

$x=\sqrt{((i-X_{ref})^2+(j-Y_{ref})^2)}$  (1)

The Gaussian distribution f(x) has the following expression, in which $\sigma^2$ is the variance of the distribution and exp is the well-known exponential function.

$f(x)=1/\sqrt{(2\pi\sigma^2)} \cdot \exp(-x^2/(2\sigma^2))$  (2)

Weights are calculated for all pixel positions in the image, and the resultant values are stored in the memory. In this embodiment, a weight is calculated for each pixel, but it is also possible to speed up the processing by calculating a single weight for an area made up of a given number of pixels, such as a rectangular area. For repetitive processing of images of the same size, it is also possible to store the calculated weight values in advance in a table, and read out the weight of the pixel of interest from the value of the distance to the image reference position.

After the weights are calculated, an area partitioning process is performed in step S5. The details of the area partitioning process in step S5 will be described with reference to the flowchart in FIG. 4.

In this embodiment, incidentally, the order of steps is S2-S3-S4, but it may be S3-S4-S2 instead.

Referring to FIG. 4, first, a plurality of starting points area set as process starting positions, and one of them is selected in step R1. In this embodiment, four starting points are placed in the four corners of the image, and the process from step R1 to step R9 is looped so that step R1 is performed four times. The first time step R1 is performed, any one of the plurality of process starting positions is selected. Each time step R1 is performed again, a different one of the remaining process starting positions is selected.

Next, in step R2, the position, (the x-y coordinates) of a pixel of interest is set. The pixel of interest is selected from among pixels that are adjacent to the background area recognized so far and have not yet been categorized as belonging to the background area or a non-background area.

In step R3, a threshold value Th(i, j) is calculated for the pixel of interest from the weight value w(i, j) of the pixel of interest and a base reference value $Th_{base}$ (a predetermined constant, such as 32), by the following formula:

$Th(i,j)=w(i,j) \times Th_{base}$  (3)

In step R4, the absolute difference (diff) between the pixel value (val(i, j)) of the pixel of interest and the average pixel value ($\Sigma val(x-y)/N$) of the pixels that have been recognized as belonging to the background area from the start of the area partitioning process up to the current point in the process is obtained by the following expression:

$diff=|\Sigma val(x-y)/N-val(i,j)|$  (4)

where, val is a function of the x-y coordinates and indicates a pixel value of the pixel found at the x-y coordinate position (such as a luminance value or a red, green, or blue color value); (x-y) indicates the x-y coordinates of a pixel that has already been recognized as belonging to the background area; N indicates the total number of pixels that have already been recognized as belonging to the background area.

Next, in step R5, the absolute difference value (diff) is compared with the threshold value Th(i, j). If the absolute difference value is smaller than the threshold value, the operation proceeds to step S6; if the absolute difference value is equal to or greater than the threshold value, the operation proceeds to step R7.

In step R6, the pixel of interest is recognized as belonging to the background; in step R7, the pixel of interest is recognized as belonging to a non-background area.

Step R8 is a decision as to whether or not there remains any pixel that has not yet been recognized as belonging to the background or non-background area but which is adjacent to a pixel that has already been recognized as belonging to the background area in the partitioning process that began at the current process starting point. If there remains such a pixel, the operation returns to step R2; otherwise, it proceeds to step R9.

Step R9 is a decision as to whether or not the area partitioning process has been completed for all of the plurality of process starting positions. If the area partitioning process has been carried out from all of the process starting positions, the operation proceeds to step R10; otherwise it returns to step R1.

In step R10, a combining process is performed on the results of the area partitioning process. That is, background areas that have been separately recognized from the different process starting positions are combined into one background area. Pixels not included in any background area are recognized as belonging to the non-background area (foreground area or subject area), and the operation is terminated.

As described above, in the first embodiment the threshold value used in the area partitioning process is varied according to the position of the pixel of interest, the threshold value increasing with increasing distance from the center of the image, making the criterion for adding pixels to the background area increasingly lenient. Since the four corner pixels are automatically placed in a single combined background area, all pixels distant from the center also tend to be placed in the same background area, enabling the entire background area to be extracted as single combined area without the incorrect exclusion of any background pixels, even if the background has gradations of color or luminance.

Second Embodiment

If the input image has a typical layout in which the subject is disposed in the central area and the remaining area including the four corners constitutes a background area, the first embodiment can identify the background area with high precision through an area partitioning process starting in the four corners. If the input image does not have the above typical layout, however, the first embodiment does not necessarily produce the desired result. In order to address this problem, the second embodiment enables the user to use an input device such as a mouse to input process starting positions and image reference positions, as described below.

Figure 6:
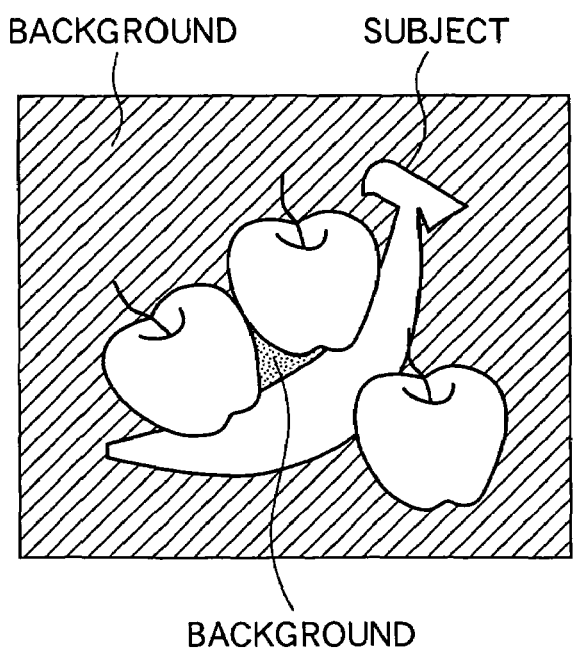
FIG. 6 shows an image in which the background includes an island surrounded by subject areas.

In contrast to the first embodiment, which sets the pixel positions in the four corners of an image as the process starting positions, the second embodiment enables an arbitrary number of points anywhere in the background area to be set as process starting positions, thereby accommodating images in which the subject area covers one or more of the corner areas. The second embodiment also accommodates images like the one shown in FIG. 6, in which the background includes one or more island-like areas surrounded by subject areas, by enabling a process starting position to be set within each island of background so that the island area can be recognized as a part of the background area surrounding the subject.

Figure 7:
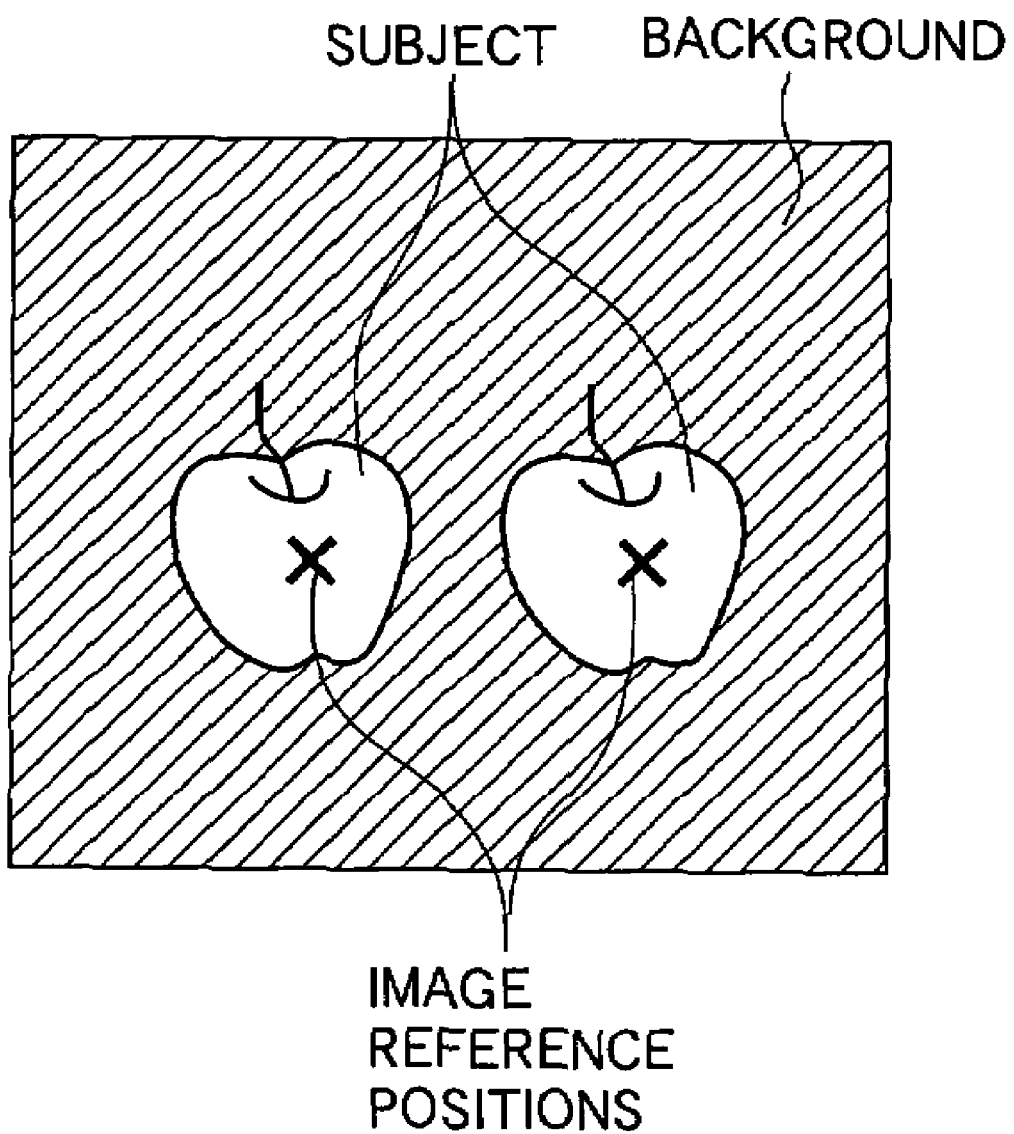
FIG. 7 shows an image in which it is preferable to set two image reference positions.

In the first embodiment, one image reference position is set at the center of the image, but the second embodiment also accommodates images in which a plurality of subject areas are distributed as shown in FIG. 7, by enabling the user to designate a reference position in each subject area.

Figure 8:
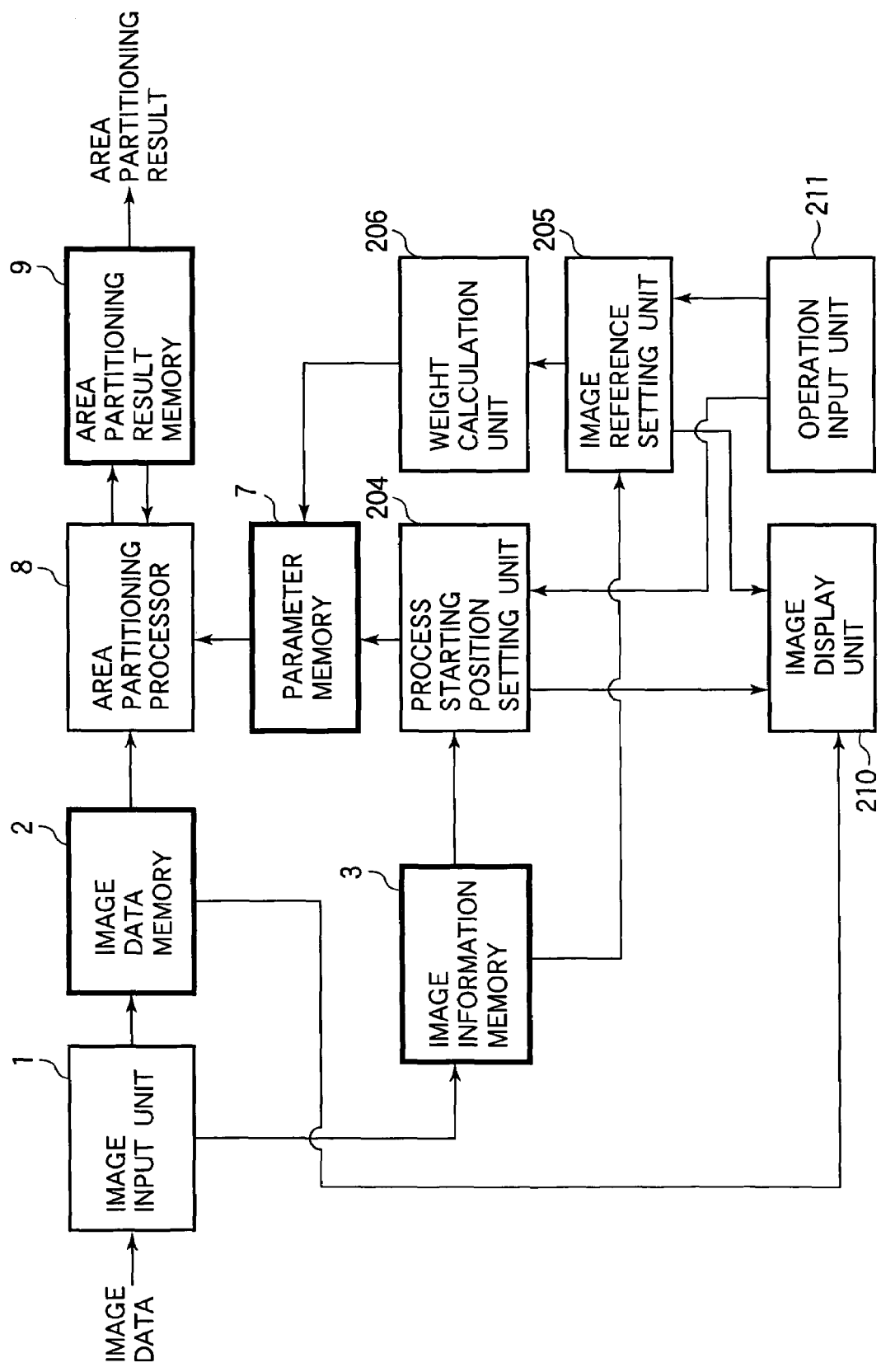
FIG. 8 is a block diagram illustrating the structure of the image processing apparatus in the second embodiment.

Referring to FIG. 8, in the second embodiment, the process starting position setting unit 4, image reference setting unit 5, and weight calculation unit 6 in the first embodiment are replaced by a different process starting position setting unit 204, image reference setting unit 205, and weight calculation unit 206, respectively, and an image display unit 210 and an operation input unit 211 are added.

The image display unit 210 displays an image on the screen of the image processing apparatus to enable the user to see the image being processed; the operation input unit 211 is used by the user to perform operations with a mouse, a keyboard, or any other applicable type of input device while viewing the image displayed on the screen.

The process starting position setting unit 204 sets the x-y coordinates of one or more process starting positions which the user designates by operating the mouse or other input device while viewing the image on the screen, and stores the x-y coordinates in the image reference setting unit 5. The image reference setting unit 205 sets the x-y coordinates of one or more image reference positions, which the user can designate by operating the mouse or other input device while viewing the image on the screen, and stores the values of the x-y coordinates in the image reference setting unit 5. The weight calculation unit 206 calculates weights from the image reference position(s) set by the image reference setting unit 205.

Next, the operation of the image processing apparatus in the second embodiment will be described with reference to the flowchart in FIG. 9. Steps S1 and S5 are the same as in the flowchart in FIG. 2, so only steps S202, S203, and S204 will be described below.

In step S202, the process starting positions are set. In this embodiment, the user views the image and designates at least one process starting position within a recognizable background area. The x-y coordinates of the designated positions are set as process starting positions.

In step S203, the image reference positions are set. In this embodiment, the user views the image and designates at least one image reference position within a recognizable subject area. The x-y coordinates of the designated reference positions are set as image reference positions.

Figure 11:
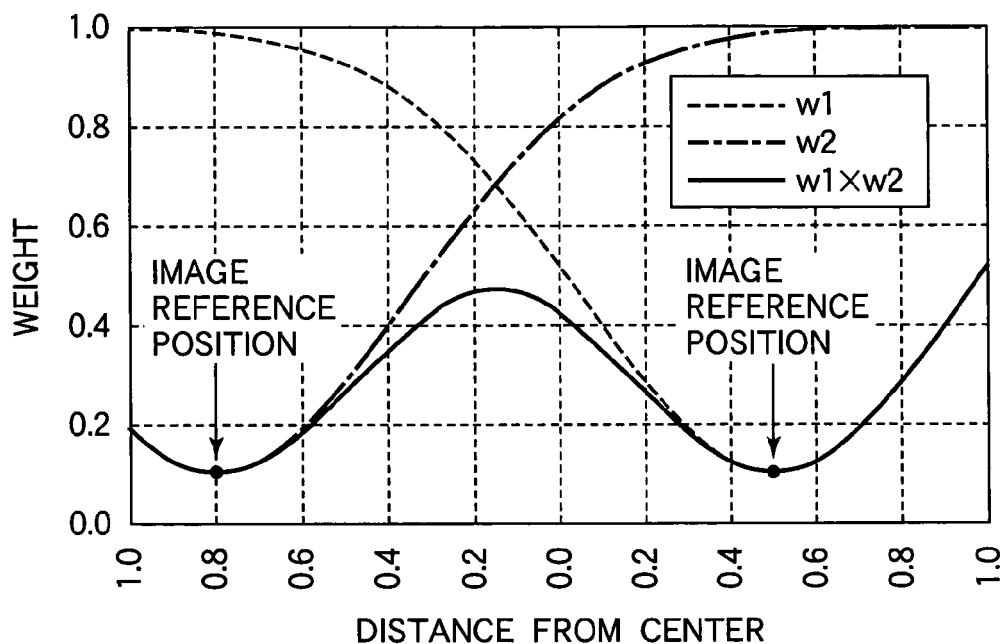
FIG. 11 shows a weight distribution when two arbitrary positions are set as image reference positions.

In step S204, a weight is calculated for each pixel. The weight distribution in the case where only one image reference position is designated is as shown in FIG. 10, and the weight is calculated according to the formula (1) given in the first embodiment. The weight distribution in the case where two or more image reference positions are designated is as shown in FIG. 11; in this case, individual weights are calculated by the above formula (1) for each image reference position and the results are combined. For example, if two points, a first point and a second point, are designated as image reference positions, then for each coordinate position (i, j), a first weight w1(i, j) is calculated using the first point as the reference position and a second weight w2(i, j) is calculated separately using the second point as the reference position. The weight w(i, j) of the pixel at position (i, j) is the product of the first and second weights:

$$w(i,j)=w1(i,j) \times w2(i,j) \quad (5)$$

Similarly, when three or more image reference positions are designated, separate distributions of weights are calculated using each image reference position and the product of the separate weights at each coordinate position (i, j) is taken to determine the weight w(i, j) of the pixel at that position.

Instead of the product, the sum of the separate weights may be used. Alternatively, when two or more image reference positions are designated, instead of calculating separate distributions of weights for each image reference position and multiplying or adding them together, it is also possible to select the image reference position nearest to the pixel of interest and use the selected image reference position to calculate the weight of that pixel.

In this embodiment, if the processing is repetitively performed under the same conditions, it is also possible, as in the first embodiment, to store the values of weights calculated in advance in a table or the like, so that the values of the weights can be obtained from the values of distances to the image reference positions.

As described above, the second embodiment enables the user to set process starting positions and image reference positions while viewing the image, thereby enabling the process parameters to be tailored to the image, so that accurate area partitioning can be achieved for all types of images. For the user, designating starting positions and image reference positions by, for example, clicking on a few points with a mouse is much easier than drawing outlines around subject areas as required in the prior art.

Third Embodiment

Figure 12:
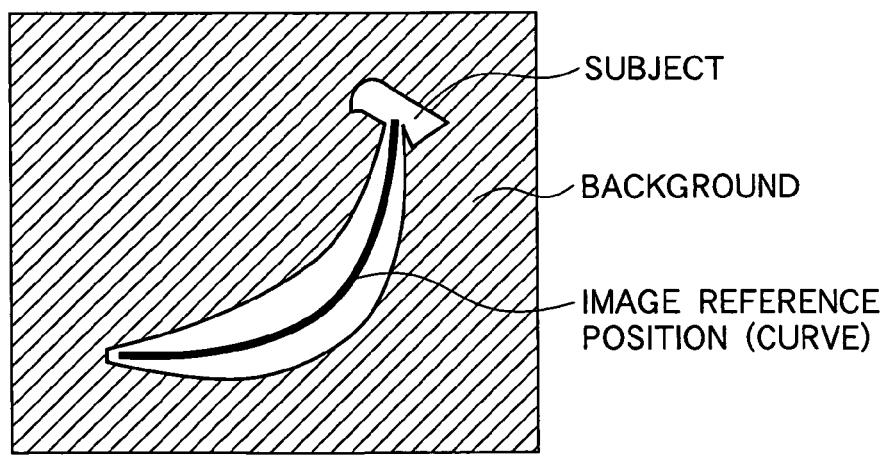
FIG. 12 shows an example of an image for which it is preferable to designate the image reference position as a curve.

The first and second embodiments use a constant base threshold $Th_{base}$ for deciding the threshold value Th(i, j) of each coordinate position, and a Gaussian distribution with a constant variance $\sigma^2$ for calculating weights, but the third embodiment allows the user to check the result of the area partitioning process and adjust the values of the base threshold $Th_{base}$ and variance $\sigma^2$ as necessary to change the result. Furthermore, in the first and second embodiments, one or a plurality of points are set as image reference positions, but in the third embodiment, to allow for images with elongate subjects as shown in FIG. 12, for which points are inappropriate as image reference positions, the image reference position can be set as a curve.

Figure 13:
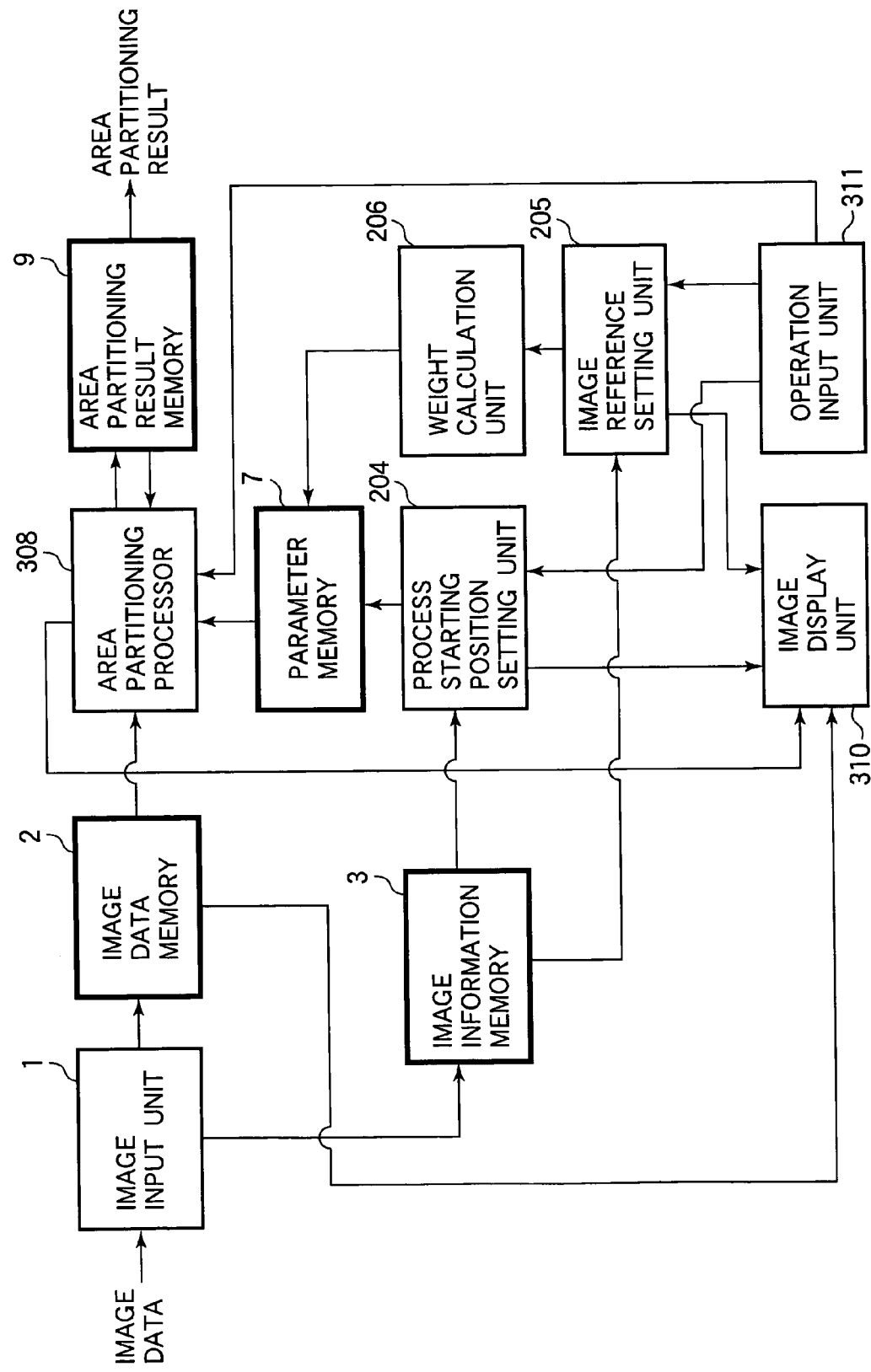
FIG. 13 is a block diagram illustrating the structure of the image processing apparatus in a third embodiment of the invention.

Referring to FIG. 13, the image processing apparatus in the third embodiment replaces the area partitioning processor 8, the image display unit 210, and the operation input unit 211 in the second embodiment with a different area partitioning processor 308, image display unit 310, and operation input unit 311.

The area partitioning processor 308 performs an area partitioning process by using image data stored in the image data memory 2, parameters stored in the parameter memory 7, information about pixels that have already undergone the area partitioning process and have been stored in the area partitioning result memory 9, and threshold calculation parameters that have been input by the user through the operation input unit 311 with a mouse, a keyboard, or the like, and stores the result of the area partitioning process in the area partitioning result memory 9. The result of the area partitioning process is displayed on a screen by the image display unit 310.

Figure 14:
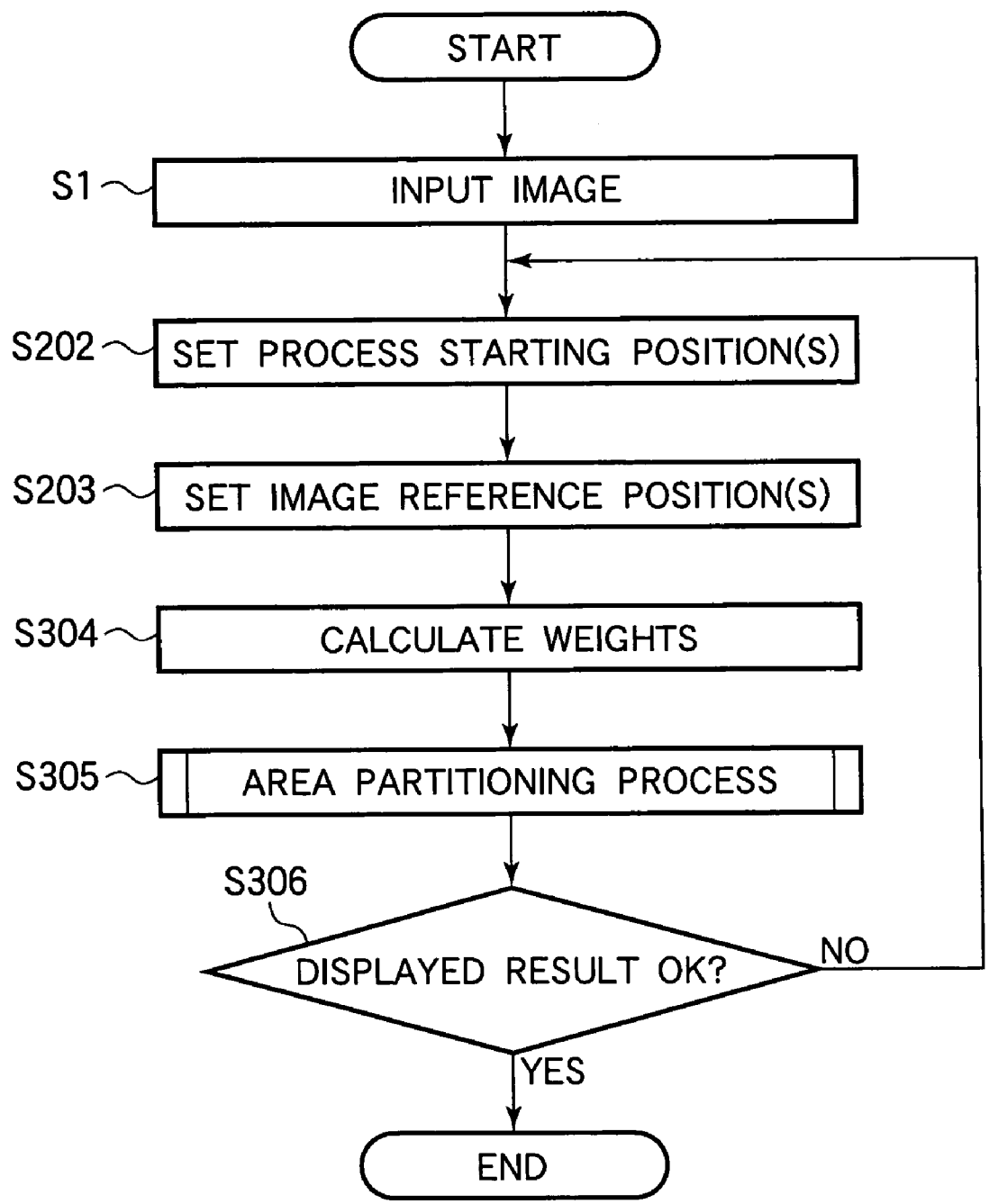
FIG. 14 is a flowchart illustrating the operation of the image processing apparatus in the third embodiment.

The processing in steps S304, S305, and S306 will be described with reference to the flowchart in FIG. 14. The processing in steps S1, S202, and S203 is the same as in FIG. 9, so descriptions will be omitted.

In step S304, a weight calculation process is performed: if the image reference position(s) are designated as points, the processing is the same as in the second embodiment; if an image reference position is designated as a curve, the following processing is performed.

In digital image processing, a curve can be considered as a collection of pixels, so in this embodiment, a pixel on the curve nearest the pixel of interest is determined. If the distance between that pixel and the pixel of interest is x, the weight w(i, j) of the pixel of interest is calculated according to the formulas (1) and (2) given in the first embodiment.

In this calculation process, the default variance $\sigma^2$ is 0.5, for example, but this value may be changed by the user. In particular, the user can view the result of the area partitioning process and change the variance value as necessary by using the mouse or keyboard, after which the area partitioning process is performed again. If the image reference position is designated with one point or a plurality of points, it is similarly possible for the user to check the result of the area partitioning process and change the variance value as necessary, after which the area partitioning process is performed again.

Figure 15:
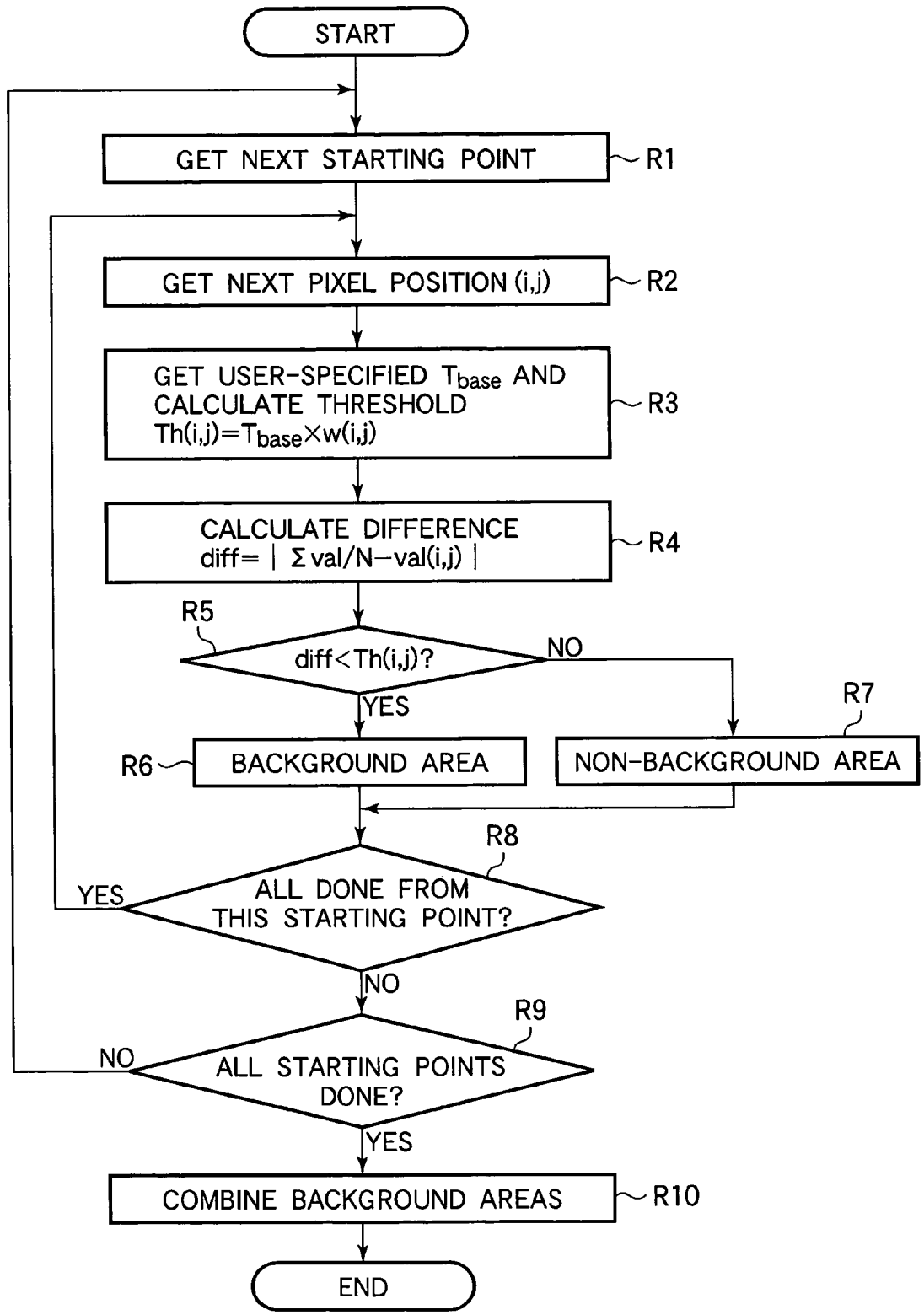
FIG. 15 is a flowchart illustrating details of the area partitioning process in the third embodiment.

In step S305, the area partitioning process is carried out. This process is shown in detail in FIG. 15. Steps R1 to R10 in FIG. 15 are the same as in FIG. 4 except that in step R3, the base threshold $Th_{base}$ is input by the user. The threshold value Th(i, j) in step R3 is calculated from the weight w(i, j) of the pixel of interest located at the x-y coordinates (i, j) and the base threshold $Th_{base}$ according to expression (3), as in the first and second embodiments.

$$Th(i,j)=w(i,j) \times Th_{base} \quad (3)$$

The first time the area partitioning process is carried out, the base threshold $Th_{base}$ may default to a constant (such as 32, for example) as in the first and second embodiments, but when the area partitioning process is repeated, the value of the base threshold $Th_{base}$ can be set to a value that the user inputs with the mouse or keyboard.

After the completion of step S305, the operation proceeds to step S306: the result of the area partitioning process is displayed on the screen; the user checks the result, and if the user accepts the result (by clicking an OK button, for example), the process is terminated; otherwise, the operation returns to step S202.

Like the second embodiment, the third embodiment provides an image display unit and an operation input unit with which the user can designate arbitrary starting positions and image reference positions. In addition, the third embodiment allows an image reference position to be designated as a curve, so that appropriate weighting parameters can be derived even for elongate subject areas, and lets the user check the result of the area partitioning process and repeat the area partitioning process, if necessary, changing the process parameters to obtain a result nearer to the user's expectations. More precise area partitioning is therefore possible than in the first and second embodiments.

The invention is not limited to the preceding embodiments. Those skilled in the art will recognize that further variations are possible within the scope of the invention, which is defined in the appended claims.

What is claimed is:

1. An image processing apparatus for partitioning an input image into a plurality of areas, the input image having a plurality of picture elements (pixels), the image processing apparatus comprising:
   a reference position setting unit for setting an image reference position in the input image;
   a weight calculation unit for calculating a distribution of weights corresponding to the input image, according to the image reference position set by the reference position setting unit;
   a starting position setting unit for setting a starting position in the input image for use in partitioning the input image into the plurality of areas; and
   a partitioning processor for using the distribution of weights calculated by the weight calculation unit and the starting position set by the starting position setting unit to partition the input image into the plurality of areas.

2. The image processing apparatus of claim 1, wherein the reference position setting unit sets the image reference position at a center of the input image.

3. The image processing apparatus of claim 1, wherein the weight calculation unit calculates a weight of a pixel of interest according to a distance between the pixel of interest and the image reference position.

4. The image processing apparatus of claim 3, wherein the weight calculation unit increases the weight as the distance between the pixel of interest and the image reference position increases.

5. The image processing apparatus of claim 1, wherein the reference position setting unit has an input means enabling a user to designate an arbitrary point in a subject area, and sets the designated point as the image reference position.

6. The image processing apparatus of claim 1, wherein the reference position setting unit sets a plurality of image reference positions, and the weight calculation unit calculates a weight of a pixel of interest by calculating a separate weight of the pixel of interest from each set image reference position and combining the separate weights.

7. The image processing apparatus of claim 1, wherein the reference position setting unit has an input means enabling a user to designate an arbitrary curve in a subject area, and sets the image reference position as a collection of pixels constituting the designated curve.

8. The image processing apparatus of claim 1, wherein the reference position setting unit sets a plurality of image reference positions and the weight calculation unit selects an image reference position nearest a pixel of interest from among the set image reference positions and calculates a weight of the pixel of interest according to a distance to the selected image reference position.

9. The image processing apparatus of claim 1, wherein the starting position setting unit sets the four corners of the input image as starting positions.

10. The image processing apparatus of claim 1, wherein the starting position setting unit has an input means enabling a user to designate an arbitrary point in the input image, and sets the designated point as said starting position.

11. The image processing apparatus of claim 1, wherein the partitioning processor calculates a threshold value of a pixel of interest from the weight calculated by the weight calculation unit for the pixel of interest and compares a value of the pixel of interest with values of pixels in already partitioned adjacent areas to determine an area in which to include the pixel of interest.

12. The image processing apparatus of claim 11, wherein the partitioning processor sets a product of the weight and a given value as the threshold value.

13. The image processing apparatus of claim 12, wherein the partitioning processor has an input means enabling a user to designate the given value.

14. A method for partitioning an input image into a plurality of areas, the input image having a plurality of pixels, the method comprising:
   setting an image reference position in the input image;
   calculating a distribution of weights corresponding to the input image, according to the image reference position;
   setting a starting position in the input image; and
   starting from the starting position and using the distribution of weights to partition the input image into the plurality of areas.

15. The method of claim 14, wherein starting from the starting position and using the distribution of weights to partition the input image into the plurality of areas further comprises:
   placing a pixel at the starting position in a background area;
   selecting pixels adjacent to the background area one by one;
   using the distribution of weights to calculate a separate threshold value for each selected pixel; and
   adding the selected pixel to the background area if the selected pixel has a value differing from a value in the background area by less than the calculated threshold value.

16. The method of claim 15, wherein the value in the background area is an average pixel value in the background area.

17. The method of claim 15, wherein using the distribution of weights to calculate a separate threshold value for each selected pixel comprises multiplying a weight of the selected pixel by a constant value, the weight of the selected pixel being given by the distribution of weights.

18. The method of claim 17, wherein the constant value is received by input from a user.

19. The method of claim 14, wherein the image reference position comprises a plurality of pixels in the image.

20. The method of claim 14, wherein:
   selecting a starting position comprises selecting a plurality of starting positions; and
   starting from the starting position and using the distribution of weights to partition the input image into the plurality of areas comprises identifying a separate background area starting from each selected starting position and combining the separate background areas into a single background area.

* * * * *

UNITED STATES PATENT AND TRADEMARK OFFICE
CERTIFICATE OF CORRECTION

PATENT NO. : 7,330,589 B2 Page 1 of 1
APPLICATION NO. : 10/975532
DATED : February 12, 2008
INVENTOR(S) : Kazuyo Watanabe It is certified that error appears in the above-identified patent and that said Letters Patent is hereby corrected as shown below:

Title Page, Item 73 (Assignee)

"OKI DATA CORPOARTION" should be changed to --OKI DATA CORPORATION--

Signed and Sealed this

Twenty-seventh Day of May, 2008

JON W. DUDAS
*Director of the United States Patent and Trademark Office*